United States Patent [19]

Kinnaird, Jr.

[11] 4,088,844

[45] May 9, 1978

[54] TELEPHONE STATION SET INTERFACE CIRCUIT

[75] Inventor: Richard Clyde Kinnaird, Jr., Matawan, N.J.

[73] Assignee: Bell Telephone Laboratories, Incorporated, Murray Hill, N.J.

[21] Appl. No.: 752,743

[22] Filed: Dec. 21, 1976

[51] Int. Cl.² .......................................... H04M 1/72
[52] U.S. Cl. ................................. 179/99; 179/81 R
[58] Field of Search .................. 179/99, 81 R, 18 FA

[56] References Cited

U.S. PATENT DOCUMENTS

| | | | |
|---|---|---|---|
| 3,701,854 | 10/1972 | Anderson et al. | 179/99 |
| 3,789,152 | 1/1974 | Medill et al. | 179/99 |
| 3,789,154 | 1/1974 | Medill | 179/99 |
| 3,914,559 | 10/1975 | Knollman | 179/99 |
| 3,997,738 | 12/1976 | Korsky et al. | 179/99 |

*Primary Examiner*—Kathleen H. Claffy
*Assistant Examiner*—Randall P. Myers
*Attorney, Agent, or Firm*—David H. Tannenbaum

[57] ABSTRACT

A telephone station set interface circuit is disclosed which enables a conventional nonkey telephone station set to be used in place of an electronic key telephone station set for those subscribers in an electronic business communication system requiring only a call origination and a call reception capability.

16 Claims, 3 Drawing Figures

TELEPHONE STATION SET INTERFACE CIRCUIT

FIELD OF THE INVENTION

This invention relates to a telephone switching system and in particular to a telephone station set interface circuit which enables subscribers requiring only a call origination and a call reception capability to replace their electronic key telephone sets with conventional nonkey telephone station sets.

BACKGROUND OF THE INVENTION

With the advent of electronic business communication systems, there is now available a business communication system in which only a fixed number of wires need be cabled out to the key telephone set regardless of the number of line pickup keys with which the set is equipped. This reduction in the number of conductors has been made possible by the dedication of certain of the wires in the cable for voice communication and certain others of the wires for only data communications functions such as transmitting lamp or ringer control signals, key button status, and call signalling information. The operated key button identity is transmitted over the data communication conductors and employed by the business communication system central processing unit to control the switching network to connect the voice communication (tip and ring) conductors of the key telephone set with the designated line. The central processor unit provides control signals for the establishment of the requisite network connections and also transmits the needed lamp and ringer control data to the key telephone station sets over the data communication conductors.

Such a system is predicated on the use of electronic key telephone sets, which contain the sophisticated electronic circuitry to communicate with the central processor unit via the data communication conductors. However, many business customers do not require multiple line pickup at every station set in the business communication system. There are numerous instances when certain stations need only a call origination and/or a call reception capability. In these situations, provision of the electronic key telephone sets with sophisticated circuitry and the associated wide range of features is not only undesirable but also uneconomical.

A certain amount of cost savings can be obtained by replacing the electronic key telephone sets with a conventional nonkey telephone station set, which provides only a call origination and a call reception capability. In doing so a problem is presented in that, while the conventional nonkey telephone station set is connectable to the dedicated voice communication conductors, there are no provisions for terminating the electronic business communication system data communication conductors.

One solution to this difficulty is the provision of a special nonkey line circuit in the electronic business communication system in place of the standard line circuit to interface the conventional two wire nonkey telephone station set with the business communication system. Prior art patents such as D. G. Medill, U.S. Pat. No. 3,789,152 issued Jan. 29, 1974 and D. G. Medill, U.S. Pat. No. 3,789,154 issued Jan. 29, 1974 teach such an arrangement. These prior art patents teach restricting the services available to certain stations to only a call origination and a call reception capability by providing these subscribers with conventional nonkey telephone station sets and special nonkey line circuits.

The Medill special nonkey line circuits convert the on-hook/off-hook idle/busy status indications appearing on the two wires of the conventional nonkey telephone station set to the digital bit stream data format required by the electronic business communication system. The special nonkey line circuit also decodes the electronic business communication system control data signals to detect signals indicative of ringing. If a ringing indication is detected, the special nonkey line circuit places a 20 cycle 90 volt ringing signal on the tip and ring conductors of the conventional nonkey tip and ring conductors of the conventional nonkey telephone station set.

Thus, these prior art special nonkey line circuits interface the low voltage digital data bit stream format employed by the electronic business communication system with the high voltage ringing and loop supervision environment of the conventional nonkey telephone station sets. The disadvantage of these prior art inerface arrangements is that each time a nonkey telephone station set is moved to another location, a telephone company craftsperson must replace the standard electronic business communication system line circuit with the special nonkey line circuit to provide an appropriate interface with the electronic business communication system. Thus, some of the cost savings inherent in the use of an inexpensive telephone station set is offset by the necessity of having a craftsperson rearrange line circuits each time a telephone station set is relocated.

An alternative to the use of special line circuits is the provision of an interface circuit in or near each conventional nonkey telephone station set. These modified conventional nonkey telephone station sets would then be connected to the standard electronic business communication line circuit. However, prior art interface circuits are incapable of being located in the conventional nonkey telephone station set due to their complex structure. The complexity of these prior art interface circuits stems from the fact that these interface circuits received and decode the digital data bit streams which comprise the control data transmitted by the business communication system to the interface circuit. In addition, these interface circuits generate and transmit an appropriately responsive digital data bit stream to provide status information to the business communication system. The decoding, interpretation and generation of these digital data bit streams requires complex logic and timing circuitry thus nullifying the economic benefits obtained by using a conventional nonkey telephone station set.

In view of the foregoing, it is an object of this invention to provide circuitry in electronic business communication systems to enable conventional nonkey telephone station sets to be interchanged with electronic key telephone sets without requiring extensive manipulation of circuitry or the continual reprogramming of the electronic business communication system central processing unit.

It is also an object of this invention to enable the interchange of electronic key telephone station sets and conventional nonkey station sets without requiring the intervention of a telephone company craftsperson.

It is a further object of this invention to provide an interface circuit which provides station signalling without resorting to the use of high voltage ringing signals.

It is a further object of this invention to provide an interface circuit locatable in the conventional nonkey telephone station set itself and operable from power supplied over the data communication conductors.

It is a further object of this invention to provide a interface circuit that is of less cost and complexity than prior art circuit arrangements.

SUMMARY OF THE INVENTION

In accordance with my invention, I provide an interface circuit, locatable in or near a conventional nonkey telephone station set, which interfaces the conventional nonkey telephone station set with the standard electronic business communication system line circuit. This is accomplished by connecting the dedicated voice communication conductors to the conventional nonkey telephone station set tip and ring conductors while terminating the data communication conductors on the interface circuit located in or near the conventional nonkey telephone station set.

In the disclosed embodiment, the data communication conductors comprise two pairs of conductors, to wit, a data transmit pair and a data receive pair. The electronic business communication system communicates with the station sets by periodically transmitting data messages containing a standard number of bits to the station sets via the data receive pair. The disclosed interface circuit receives both data and power from the electronic business communication system line circuit on the data receive conductors and separates the data signal from the power, using the power to operate the interface circuit. The data signal is forwarded to a signal gate in the interface circuit which either passes or blocks the data signal dependent on the busy/idle status of the associated conventional nonkey telephone station set, as indicated by the switchhook contacts. If the signal gate passes the data signal, the interface circuit retransmits the data signal back to the standard electronic business communication system line circuit to indicate the busy status of the associated station set. A nonreturned signal is indicative of the idle status of the associated station set. Only a minor programming change is required in the electronic business communication system central processing unit to enable the system to recognize this unique method of communicating busy/idle status information.

The other information transfer required between the electronic business communication system line circuit and the conventional nonkey telephone station set via the data communication conductors is the provision of a ringing indication. The disclosed interface circuit generates an audible alerting tone rather than require the electronic business communication system to provide high voltage ringing to the conventional nonkey telephone station set. To provide a ringing indication to a conventional nonkey telephone station set, the electronic business communication system central processing unit generates a data message containing more than the standard number of bits, called a "long message". The interface circuit contains a ringing detector which monitors the incoming data messages and detects the presence of a "long message". If a "long message" is received by the conventional nonkey telephone station set, the ringing detector activates an audio oscillator which generates a tone burst signal to alert the user at the conventional nonkey telephone station set.

Thus, the disclosed interface circuit provides a simple interface between the conventional nonkey telephone station set and the standard electronic business communication system line circuit. The interface circuit supplies the electronic business communication system with busy/idle status indications while providing a ringing indication to the subscriber in response to a data message from the electronic business communication system. The disclosed interface circuit accomplishes these functions without decoding, interpreting and generating digital data bit streams as required by prior art interface circuits. Thus, the disclosed interface circuit enables a modified conventional nonkey telephone station set to be "plug compatible" with the electronic business communication system line circuit and to be interchangeable with an electronic key telephone circuit.

Accordingly, it is a feature of this invention to provide interface circuit facilities to enable conventional nonkey telephone station sets to be interchanged with electronic key telephone sets.

It is a further feature of this invention to provide interface circuit facilities locatable in or near the conventional nonkey telephone station set itself and operable from power supplied over the data communication conductors.

It is a further feature of this invention to provide interface circuit facilities capable of recognizing ringing indication information without decoding the control data bit stream transmitted over the data communication conductors by the electronic business communication system.

It is a further feature of this invention to provide interface circuit facilities that are responsive to a standard busy/idle status inquiry by the electronic business communication system for providing a response indicative of the status of the associated station set without decoding and interpreting the control data bit stream transmitted by the electronic business communication system.

BRIEF DESCRIPTION OF THE DRAWING

The operation and utilization of the present invention will be more fully apparent from the following description of the drawing, in which.

Figure 1:
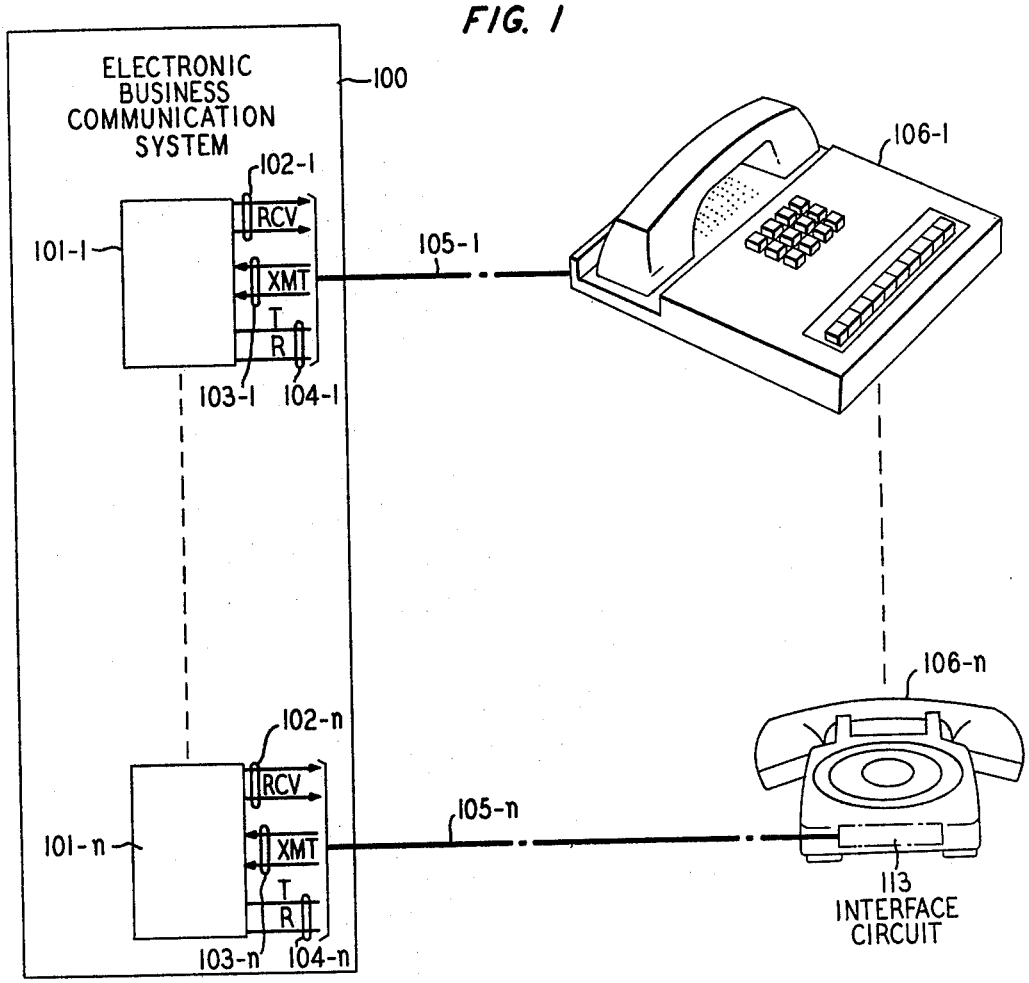
FIG. 1 illustrates a block diagram of the disclosed telephone switching system arrangement.
Figure 2:
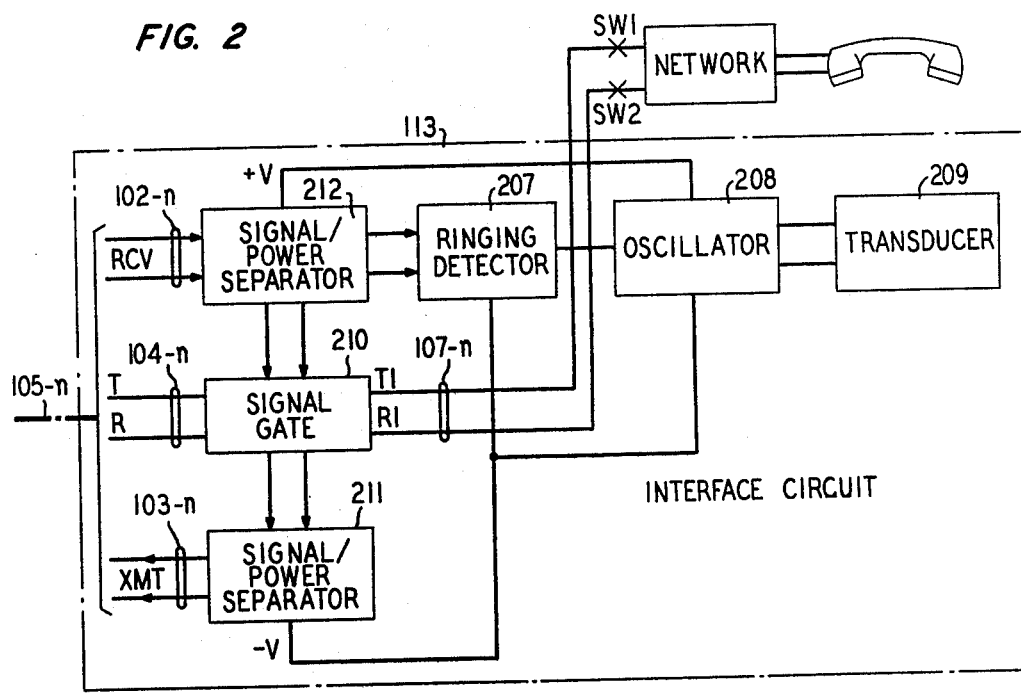
FIG. 2 illustrates one embodiment of the invention in block diagram form.

GENERAL DESCRIPTION — FIGS. 1 and 2

FIG. 1 shows one embodiment of my invention wherein each of a number of telephone station sets, 106-l through 106-n, are connected to corresponding line circuits, 101-l through 101-n, of an electronic business communications system, 100. Electronic business communication systems are well known in the art and will not be discussed herein. The electronic business communication system used in the present disclosure can be of the type disclosed in the D. G. Medill et al, U.S. Pat. Nos. 3,789,152 and 3,789,154 both issued Jan. 29, 1974.

The line circuits 101-l through 101-n of electronic business communication system 100 can be of the standard type disclosed in the above-mentioned Medill patents. These line circuits function to interface the associated telephone station set with the electronic business communication system switching network and central processing unit. The telephone station sets associated with electronic business communication systems are electronic key telephone station sets such as that pictorially illustrated by telephone station set 106-*l* and disclosed in H. P. Anderson et al, U.S. Pat. No. 3,701,854 issued Oct. 31, 1972. These electronic key telephone station sets require a voice communication connection as well as a data communication connection to the electronic business communication system line circuit. The data communication conductors comprise a data receive pair, 102-*l*, and a data transmit pair, 103-*l*, while the voice communication conductors comprise the standard tip and ring (T & R) conductors, 104-*l*. The electronic business communication system communicates with the electronic key telephone sets via the data transmit and data receive pairs by periodically exchanging digital data messages consisting of a fixed number of bits. These digital data messages provide the button, lamp and switchhook status information as well as supplying a ringing signal indication.

As electronic business communication system central processing unit periodically scans all the line circuits in the system to determine or update their status. For example, the central processing unit described in the aforementioned Medill patents scans at a 15.6 KHz sample rate, transmitting a standard 3 bit message to each line circuit in turn. These 3 bit messages are forwarded via the data communication conductors to the electronic key telephone sets associated with these line circuits. The electronic key telephone sets contain sophisticated circuitry to decode and interpret these standard 3 bit messages and generate an appropriate 3 bit reply message to indicate the present status of the electronic key telephone set. Thus, all button, lamp, and switchhook status information as well as ringing indications are encoded into the 3 bit message format and transmitted over the data communication conductors between the electronic business communication system standard line circuit and an associated electronic key telephone set.

However, conventional nonkey telephone station sets, such as station set 106-*n*, cannot accommodate the standard data communication connection to the electronic business communication system line circuit. Therefore, the disclosed invention deploys an interface circuit, 113, inside or near each conventional nonkey telephone station set to enable these conventional station sets to be used in conjunction with an electronic business communication system. Interface circuit 113 serves to terminate data receive pair 102-*n* and data transmit pair 103-*n* of cable 105-*n*, while tip and ring conductors 104-*n* are connected to the interface circuit 113 and secondary tip and ring conductors 107-*n* are connected to conventional nonkey telephone station set 106-*n*.

FIG. 2 discloses the general structure of interface circuit 113 in block diagram form. In FIG. 2 it can be seen that interface circuit 113 comprises a pair of signal/power separators 211 and 212 which are connected to data transmit pair 103-*n* and data receive pair 102-*n*, respectively. Signal/power separators 211 and 212 remove power from data communication conductors 102-*n* and 103-*n* and supply positive and negative potential, +V and −V, to power interface circuit 113. The data signal itself is transferred from signal/power separator 212 to ring detector circuit 207 which detects the presence of a special "long message" ring enable signal and activates oscillator 208 when an enable signal is present. The output of oscillator 208 is connected to transducer 209 to generate an audible alerting tone.

The data signal received by signal/power separator 212 is also applied to signal gate 210, which supplies a busy/idle indication for conventional nonkey telephone station set 106-*n*. Since conventional nonkey telephone station set 106-*n* has only an off-hook/on-hook status, signal gate 210 serves to pass or block the received data signal to signal/power separator 221 for retransmission back to electronic business communication system 100. Thus, the busy indication of the conventional nonkey telephone station set is a retransmission back to the electronic business communication system of the digital data message transmitted by the electronic business communication system to the conventional nonkey telephone station set.

Only a minor programming change is required in the electronic business communication system central processing unit to enable the system to recognize this unique method of communicating busy/idle status information. The programming required is even simpler if each nonkey telephone station set is assigned a distinctive class of service indicating the restricted nature of these telephone station sets. The electronic business communication system processor recognizes the distinctive class of service and then awaits the unique busy/idle status indication message.

DETAILED DESCRIPTION — FIG. 3

Figure 3:
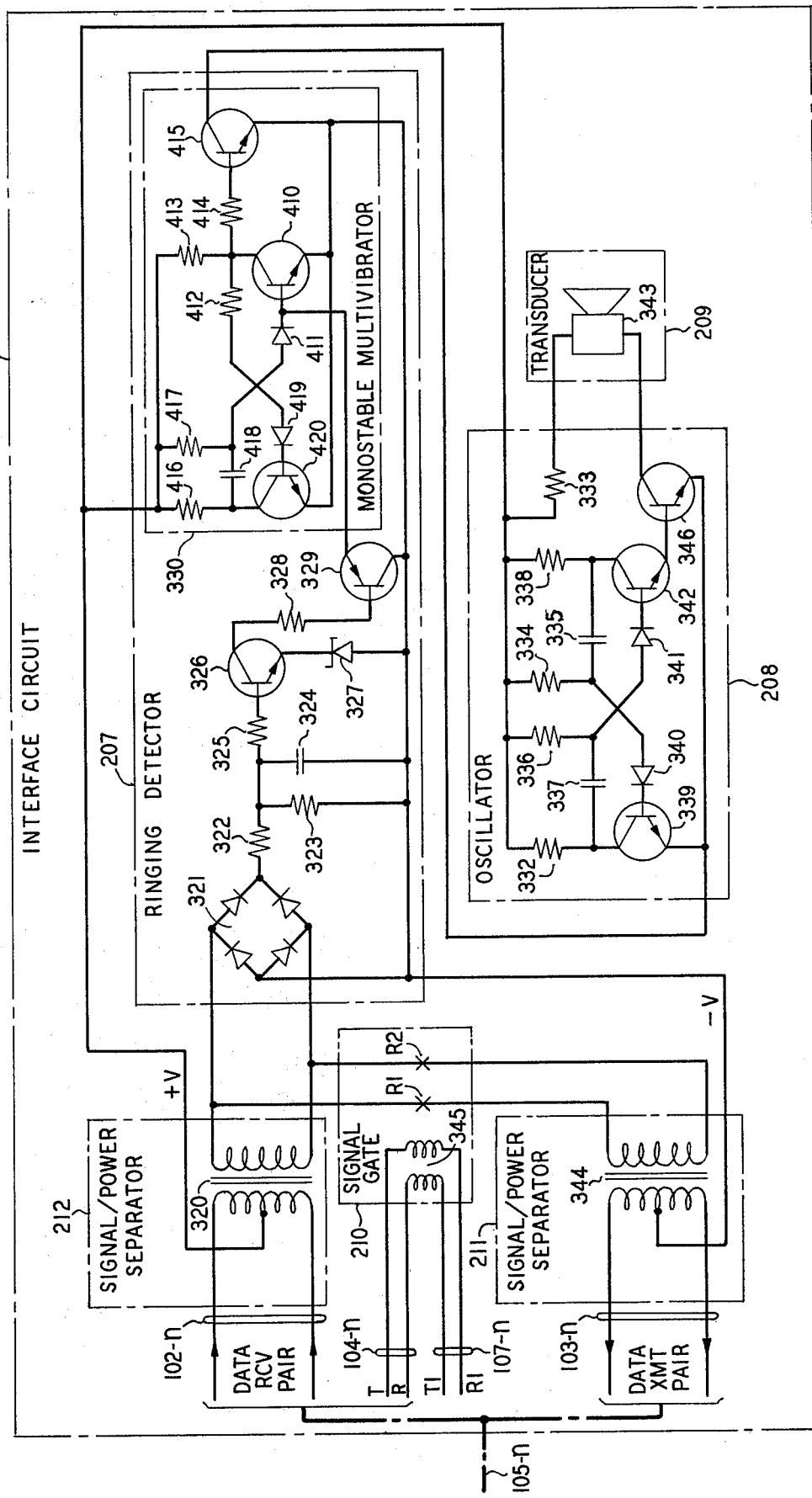
FIG. 3 shows a detailed circuit diagram of a preferred embodiment of the invention.

FIG. 3 discloses a preferred embodiment of the interface circuit illustrated in FIG. 2. For simplicity sake, the electronic business communication system and the electronic key telephone station sets have been omitted from FIG. 3 although the following description is with respect to the system arrangement illustrated in FIG. 1.

Assume that the disclosed electronic business communication system has been programmed to recognize a distinctive class of service as indicative of a conventional nonkey telephone station set connected to the standard electronic business communication system line circuit. Thus, when the electronic business communication system central processing unit queries the conventional nonkey telephone station set illustrated in FIG. 1, as to its busy/idle status, a standard length data message is transmitted to interface circuit 113 via data receive pair 102-*n*. The electronic business communication system has determined from the assigned class of service that station set 106-*n* is a conventional nonkey telephone station set which will/will not return its unique form of data message indicating the busy/idle status information. The transmitted data message is received by interface circuit signal/power separator 212 which forwards the data message to signal gate 210. If conventional nonkey telephone station set 106-*n* containing interface circuit 113 is idle, released relay make contacts R1 and R2 are open thus permitting no signal to pass through signal gate 210 to data transmit pair 103-*n* via signal/power separator 211. The electronic business communication system receives no response signal from conventional nonkey telephone station set 106-*n*, which thereby indicates the idle condition of this station set. Thus, if nonkey telephone station set 106-*n* were disconnected or data leads 102-*n* and 103-*n* were broken, conventional nonkey telephone station set 106-*n* would always appear idle and would not cause a trouble condition in the electronic business communication system.

If conventional nonkey telephone station set 106-*n* were busy, current would flow through the coil winding of relay 345 and thereby cause relay make contacts R1 and R2 to close. The data message transmitted by electronic business communication system 100 would be routed via signal gate 210 and signal/power separator 211 to data transmit pair 103-n and thence retransmitted back to electronic business communication system 100, indicating the busy status of conventional nonkey telephone station set 106-n.

To provide a simple indication of ringing, the electronic business communication system processor is programmed to transmit a data message longer than the standard data message to the conventional nonkey telephone station sets. This "long message" is received by signal/power separator 212. Positive dc voltage +V is removed from data receive pair 102-n by center tap transformer 320 of signal/power separator 212. This +V voltage is used to power oscillator 208. A negative dc voltage −V is likewise removed from data transmit pair 103-n by center tap transformer 344 of signal/power separator 211 and used to power oscillator 208 and ringing detector 207. The "long message" transmitted by electronic business communication system 100 is passed by signal/power separator 212 via transformer 320 to ringing detector 207. Full wave rectifier bridge 321 converts this bit stream to a dc current which then passes through resistor 322 and charges capacitor 324. Resistor 323 is selected to have a higher resistance than resistor 322. Resistor 323 allows capacitor 324 to discharge between messages. The time constant of resistor 322 and capacitor 324 has been selected such that a standard length data message will not adequately charge capacitor 324 to turn on transistor 326 but a "long message" does charge capacitor 324 sufficiently to turn on transistor 326. Breakdown diode 327 determines the charge of capacitor 324 and hence the length of the "long message" required to turn on transistor 326. Transistor 326 turning on activates transistor 329 which, in turn, turns on monostable multivibrator 330 comprising resistors 412, 413, 414, 416, 417, transistors 410, 415, 420, diodes 411, 419, and capacitor 418. Resistor 417 and capacitor 418 have been selected to insure that transistor 415 stays on between messages. When on, transistor 415 connects oscillator 208 to negative voltage −V obtained from transformer 344, thus turning on audio oscillator 208. The output of oscillator 208 is applied to transducer 209 to supply an audible signal through a loudspeaker 343. Resistors 334 and 336 and capacitors 335 and 337 are selected to determine the frequency of oscillation. Thus, a "long message" is detected by ringing detector 207 which, in turn, turns on oscillator 208 supplying an audible signal to the subscriber at station set 106-n via transducer 209.

Thus, the disclosed interface circuit provides a simple interface between a conventional nonkey telephone station set and the electronic business communication system line circuit. The interface circuit supplies the electronic business communication system with busy-idle status indications while providing a ringing indication to the subscriber in response to a ringing indication data message from the electronic business communication system. The disclosed interface circuit is simple and inexpensive and can be located inside a conventional nonkey telephone station set so as to make the conventional nonkey telephone station set interchangeable with an electronic key telephone set.

While a specific embodiment of the invention has been disclosed, variations in procedural and structural detail within the scope of appended claims are possible, and are contemplated. There is no intention of limitation to what is contained in the abstract of the exact disclosure as herein presented. The above described arrangements are only illustrative of the application of the principles of the invention. Normally, other arrangements may be devised by those skilled in the art without departing from the spirit and the scope of the invention.

What is claimed is:

1. An interface circuit for use between a telephone switching system and a nonkey telephone station set wherein said telephone switching system transmits control signals to and receives status signals from each telephone station set associated with said telephone switching system over a data link independent of a speech path; wherein said interface circuit comprises:
   means for terminating said data link independent of said speech path connected to said nonkey telephone station set;
   means for receiving said control signals from said telephone switching system over said data link; and
   means controlled by said nonkey telephone station set for transmitting said control signals back over said data link to said telephone switching system to indicate the status of said nonkey telephone station set.

2. The invention of claim 1 wherein said means controlled by said nonkey telephone station set comprises:
   means controlled by the off-hook state of said nonkey telephone station set and responsive to the receipt of said control signals from said telephone switching system over said data link for retransmitting said control signals back to said telephone switching system over said data link to indicate the off-hook status of said nonkey telephone station set, and
   means controlled by the on-hook state of said nonkey telephone station set and responsive to the receipt of said control signals from said telephone switching system over said data link for blocking the retransmission of said control signals back to said telephone switching system over said data link to indicate the on-hook status of said nonkey telephone station set.

3. The invention of claim 2 wherein:
   said data link comprises a data transmit pair for carrying said control signals from said interface circuit to said telephone switching system to indicate the busy state of said nonkey telephone station set, a data receive pair for carrying said control signals from said telephone switching system to said interface circuit; and
   said means controlled by the off-hook state of said nonkey telephone station set comprises a relay and a transformer for connecting said data transmit pair to said data receive pair.

4. The invention of claim 3 wherein said means controlled by the on-hook state of said nonkey telephone station set comprises contacts of said relay which open in response to the on-hook condition of said nonkey telephone station set and which disjoin said data transmit pair from said data receive pair.

5. The invention of claim 1 wherein said control signals received by said interface circuit from said telephone switching system include ringing control information, wherein said interface circuit additionally comprises:

means for detecting said ringing control information; and means for generating an audible tone signal in response to the detection of said ringing control information.

6. The invention set forth in claim 5 wherein said control signals include signals having a first duration and a second duration longer than said first duration wherein said ringing control information signals are of said second duration; and said detecting means includes timing means responsive to the receipt of said control signals from said telephone switching system over said data link having said second duration for enabling said generating means.

7. The invention of claim 6 wherein said timing means is responsive solely to the duration of said control signals.

8. The invention of claim 6 wherein said generating means is powered exclusively from said data link.

9. An interface circuit for use in an electronic telephone switching system having at least one conventional nonkey telephone station set and a plurality of electronic key telephone station sets, wherein said electronic telephone switching system transmits control data signals to and receives call data signals from each said electronic key telephone station set over a corresponding data link independent of a speech path; wherein said interface circuit is associated with each said conventional nonkey telephone station set and comprises:

means for providing a termination for said data link independent of said speech path connected to said conventional nonkey telephone station set;

means for receiving said control data signals from said electronic telephone switching system over said data link independent of said speech path; and means for transmitting said received control data signals over said data link to said electronic telephone switching system to indicate the status of said nonkey telephone station set.

10. The invention of claim 9 wherein each said data link comprises a data transmit pair for carrying said call data signals from said electronic key telephone station set to said electronic telephone switching system, a data receive pair for carrying said control data signals from said electronic telephone switching system to said electronic key telephone station set; wherein said interface circuit transmitting means comprises:

means responsive to the receipt of said control data signals from said electronic telephone switching system over said data receive pair for retransmitting said control data signals to said electronic telephone switching system over said data transmit pair when the conventional nonkey telephone station set associated with said interface circuit is off-hook; and means responsive to the receipt of said control data signals from said electronic telephone switching system over said data receive pair for blocking the retransmission of said control data signals to said electronic telephone switching system over said data transmit pair when the conventional nonkey telephone station set associated with said interface circuit is on-hook.

11. The invention of claim 10 wherein:

said retransmitting means comprises a transformer for connecting said data transmit pair to said data receive pair; and said blocking means comprises contacts which respond to the switchhook condition of said nonkey telephone station set associated with said interface circuit and which disjoin said data transmit pair from said data receive pair.

12. The invention set forth in claim 11 wherein said control data signals include signals having a first bit length; wherein said control data signals additionally include ringing control information signals having a second bit length longer than said first bit length; wherein said interface circuit includes:

audio signal generating means; and means for detecting said ringing control information wherein said detecting means includes timing means responsive to the receipt of said control data signal from said electronic telephone switching system over said data receive pair having said second bit length for enabling said signal generating means.

13. The invention of claim 12 wherein said interface circuit further includes:

power separation means for exclusively powering said interface circuit from power supplied by said electronic telephone switching system over said data link.

14. In an electronic key telephone system having at least one conventional nonkey telephone station set and a plurality of electronic key telephone station sets, wherein said electronic key telephone station set transmits data to and receives data from said electronic key telephone system over a data link independent of a speech path; an interface circuit associated with each said conventional nonkey telephone station set for providing a termination for said data link independent of said speech path connected to said conventional nonkey telephone station set, wherein said interface circuit comprises:

means responsive to the receipt of said data from said electronic key telephone system over said data link for retransmitting the received data to said electronic key telephone system over said data link when the conventional nonkey telephone station set associated with said interface circuit is off-hook;

means responsive to the receipt of said data from said electronic key telephone system over said data link for blocking the return of said received data to said electronic key telephone system over said data link when the conventional nonkey telephone station set associated with said interface circuits is on-hook;

detecting means responsive to the receipt of data containing ringing control information from said electronic key telephone system over said data link for generating an output signal; and generating means responsive to said output signal for generating an audible tone at said conventional nonkey telephone station set.

15. The invention of claim 14 wherein said data include signals having a first bit length; wherein said data additionally include ringing control information signals having a second bit length longer than said first bit length; and said detecting means include timing means responsive to the receipt of said data from said electronic telephone switching system over said data link having said second bit length for enabling said generating means.

16. The invention of claim 15 wherein said interface circuit further includes:

power separation means for exclusively powering said interface circuit from power supplied by said electronic telephone switching system over said data link.

* * * * *